(12) United States Patent
Saen et al.

(10) Patent No.: US 7,529,874 B2
(45) Date of Patent: May 5, 2009

(54) SEMICONDUCTOR INTEGRATED CIRCUIT DEVICE FOR REAL-TIME PROCESSING

(75) Inventors: Makoto Saen, Kodaira (JP); Tetsuya Yamada, Sagamihara (JP); Satoshi Misaka, Kokubunji (JP); Keisuke Toyama, Yokohama (JP); Kenichi Osada, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 123 days.

(21) Appl. No.: 11/545,510

(22) Filed: Oct. 11, 2006

(65) Prior Publication Data

US 2009/0089786 A1    Apr. 2, 2009

(30) Foreign Application Priority Data

Oct. 12, 2005    (JP) .............................. 2005-297932

(51) Int. Cl.
*G06F 13/00* (2006.01)
*G06F 9/00* (2006.01)

(52) U.S. Cl. .................. 710/244; 718/102; 718/103

(58) Field of Classification Search ................ 710/240, 710/244; 718/102, 103
See application file for complete search history.

(56) References Cited

U.S. PATENT DOCUMENTS

| | | | |
|---|---|---|---|
| 6,829,764 B1 * | 12/2004 | Cohen et al. ................ | 718/103 |
| 2002/0023118 A1 * | 2/2002 | Peled et al. ................. | 709/104 |
| 2002/0065049 A1 | 5/2002 | Chauvel et al. | |
| 2003/0187907 A1 | 10/2003 | Ito | |
| 2006/0190943 A1 * | 8/2006 | Haeri .......................... | 718/103 |
| 2007/0094664 A1 * | 4/2007 | So et al. ...................... | 718/103 |
| 2007/0118838 A1 * | 5/2007 | Tsujino et al. .............. | 718/103 |
| 2007/0143762 A1 * | 6/2007 | Arnold et al. ............... | 718/103 |
| 2007/0169126 A1 * | 7/2007 | Todoroki et al. ............ | 718/103 |
| 2008/0052716 A1 * | 2/2008 | Theurer ...................... | 718/103 |
| 2008/0066070 A1 * | 3/2008 | Markov ...................... | 718/103 |

FOREIGN PATENT DOCUMENTS

| | | |
|---|---|---|
| EP | 1096360 B1 | 9/2004 |
| JP | 2001-2290404 | 8/2001 |
| JP | 2002-202893 | 7/2002 |
| JP | 2002-269032 | 9/2002 |
| JP | 2003/298599 | 10/2003 |

* cited by examiner

*Primary Examiner*—Glenn A Auve
(74) *Attorney, Agent, or Firm*—Mattingly & Malur, P.C.

(57) ABSTRACT

A technology capable of efficiently performing the processes by using limited resources in an LSI where a plurality of real-time applications are parallelly processed is provided. To provide such a technology, a mechanism is provided in which a plurality of processes to be executed on a plurality of processing units in an LSI are managed throughout the LSI in a unified manner. For each process to be managed, a priority is calculated based on the state of progress of the process, and the execution of the process is controlled according to the priority. A resource management unit IRM or program that collects information such as a process state from each of the processing units executing the processes and calculates a priority for each process is provided. Also, a programmable interconnect unit and storage means for controlling a process execution sequence according to the priority are provided.

12 Claims, 8 Drawing Sheets

SEMICONDUCTOR INTEGRATED CIRCUIT DEVICE FOR REAL-TIME PROCESSING

CROSS-REFERENCE TO RELATED APPLICATION

The present application claims priority from Japanese Patent Application No. JP 2005-297932 filed on Oct. 12, 2005, the content of which is hereby incorporated by reference into this application.

TECHNICAL FIELD OF THE INVENTION

The present invention relates to a semiconductor integrated circuit device (hereinafter, referred to as "LSI"). More particularly, it relates to a technology effectively applied to the configuration of a system LSI having integrated therein a plurality of processing units such as CPU and accelerators dedicated to a specific process.

BACKGROUND OF THE INVENTION

With the advancement of performance and multifunctionality of consumer devices such as cellular phones, digital home appliances, network devices, and car navigation systems, the higher performance and functionality are demanded also for an embedded LSI serving as the center thereof. For its achievement, the performance improvement by the parallelization of processing units including application-specific accelerators has been proceeding.

On the other hand, LSIs to be embedded are under tight cost constraints and are required to operate under limited resources (resources such as power, computing units, memory bandwidth, and the number of pins).

One of effective ways to meet such contradictory demands is to optimally schedule processes to be executed in parallel and share the use of the limited resources among a plurality of processing units.

Conventionally, several technologies classified into a bus arbitration technology are known as those used when sharing resources among a plurality of units.

A method most generally used is a round-robin scheme, which is used in the technology disclosed in Japanese Patent Application Laid-Open Publication No. 2002-269032 (Patent Document 1).

Also, another method often used in a real-time compensation system is a TDMA (Time Division Multiple Access) scheme in which an exclusive resource right is fixedly provided in a time-division manner.

Furthermore, examples of a technology for sharing the power of the LSI among a plurality of tasks are disclosed in Japanese Patent Application Laid-Open Publication No. 2001-229040 (Patent Document 2) and Japanese Patent Application Laid-Open Publication No. 2002-202893 (Patent Document 3).

Also, Japanese Patent Application Laid-Open Publication No. 2003-298599 (Patent Document 4) describes the technology relating to the present invention.

SUMMARY OF THE INVENTION

Incidentally, as a result of the studies for the LSI technologies mentioned above by the inventors of the present invention, the following has been revealed.

For example, the TDMA scheme described above has an advantage that it is possible to allocate a certain amount of resource utilization for each connected circuit module. In practice, however, the required amount of resource utilization varies depending on process data or others. In the event of the settings for the worst case, wastes increase in a typical case, which is inadequate in view of the efficiency in the resource utilization.

Therefore, an object of the present invention is to provide a technology capable of efficiently performing processes in an LSI where a plurality of real-time applications are parallelly processed, by using limited resources (such as power, memory bandwidth, and the number of pins).

The above and other objects and novel characteristics of the present invention will be apparent from the description of this specification and the accompanying drawings.

The typical ones of the inventions disclosed in this application will be briefly described as follows.

For the solution of the problems described above, a mechanism is provided, in which a plurality of processes to be executed on a plurality of processing units in an LSI are managed throughout the LSI in a unified manner. Also, a priority is calculated for each process to be managed based on the state of progress of the process, and the execution of the process is controlled according to the priority.

Therefore, the LSI according to the present invention includes a mechanism to which each processing unit executing a process notifies a state of progress or a priority, a control unit to collect information about the state of progress and calculate the priority, and a programmable scheduler for controlling an execution sequence according to the priority.

The effects obtained by typical aspects of the present invention will be briefly described below.

In the LSI where a plurality of real-time applications are parallelly processed, the processes are managed according to the priority calculated from the state of execution of each process throughout the LSI in a unified manner. Accordingly, it is possible to globally optimize the efficiency in use of limited resources. As a result, a total performance can be improved.

BRIEF DESCRIPTIONS OF THE DRAWINGS

FIGS. 4A-1 is a diagram showing a first control flow of the LSI according to one embodiment of the present invention;

FIGS. 4A-2 is a diagram showing a first control flow of the LSI according to one embodiment of the present invention;

FIGS. 5A-1 is a diagram showing a second control flow of the LSI according to one embodiment of the present invention;

FIGS. 5A-2 is a diagram showing a second control flow of the LSI according to one embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

(LSI Configuration)

[First LSI Configuration: Concentrated Management Type by Dedicated Hardware]

Figure 1:
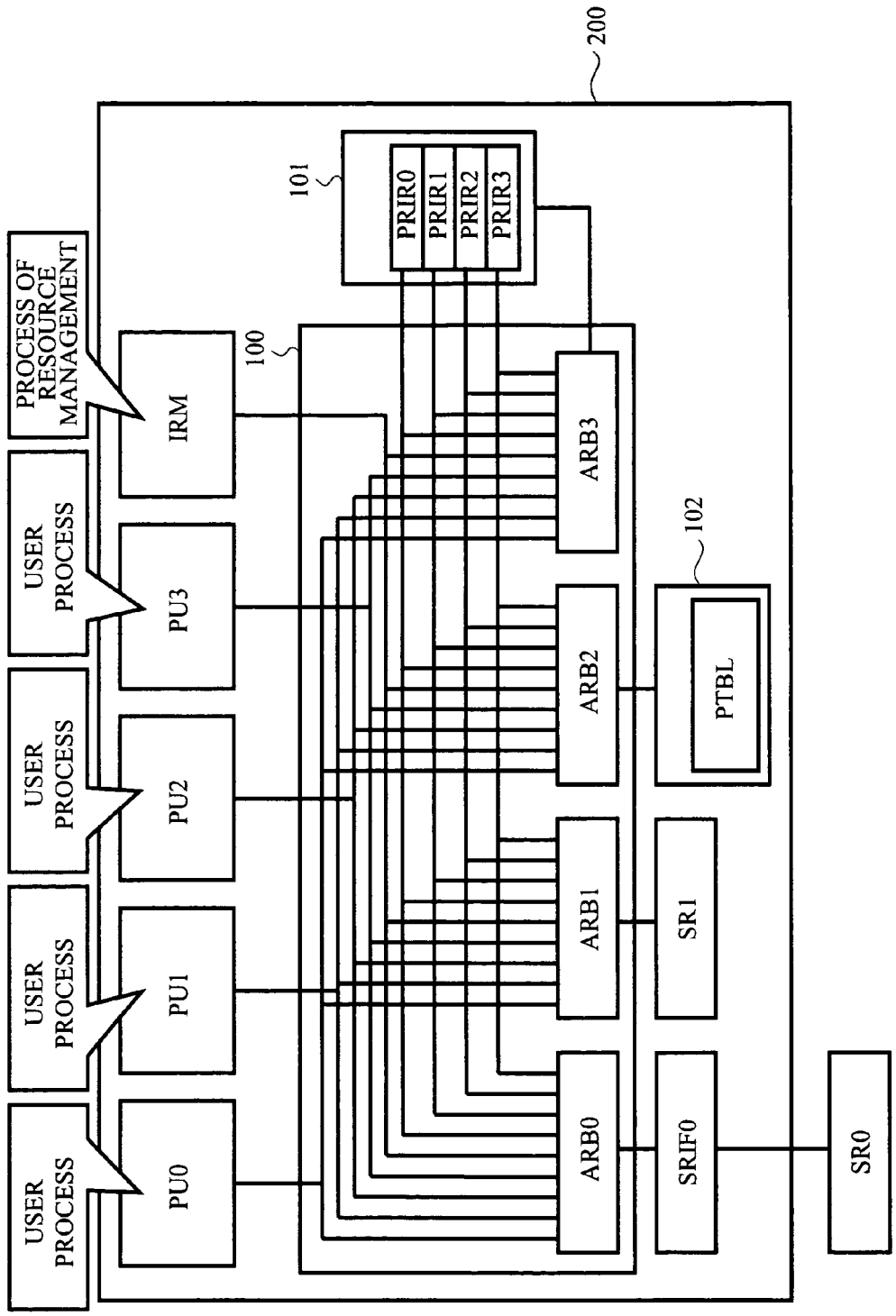
FIG. 1 is a block diagram showing a first configuration of an LSI according to one embodiment of the present invention.

FIG. 1 is a block diagram showing a first configuration of an LSI according to one embodiment of the present invention.

First, one example of configuration of the LSI according to this embodiment will be described with reference to FIG. 1. An LSI 200 according to this embodiment is an LSI mounted with a resource management function, for example. The LSI 200 includes: units similar to those in a general system LSI, for example, a plurality of processing units PU0 to PU3 such as CPUs, DSPs, or accelerator modules; an IF controller SRIF0 such as a memory IF or a PCI; a slave unit SR1; and an interconnect unit 100 connecting these units. Furthermore, the LSI 200 includes: a resource management unit IRM (control unit) that collects information about the state of progress of a process being executed on each of the processing units PU0 to PU3 and calculates a priority of each process; storage means 102 (second storage means) for retaining information necessary for the IRM to calculate a priority of each process; and storage means 101 (first storage means) for reflecting the priority calculated by the IRM on a use sequence of a shared resource. The storage means 102 includes a task management table PTBL. The storage means 101 includes PRIR0 to PRIR3.

A slave unit SR0 is a resource such as a storage device or a computing device connected to the LSI 200 and is shared among the processing units PU0 to PU3 in the LSI 200. Also, the interconnect unit 100 includes ARB0 to ARB3, which are scheduling blocks (scheduler) that determine a resource use sequence in consideration of the priority. For example, ARB0 controls the use of SRIF0, which is a shared resource among the processing units PU0 to PU3 (thus controls the use of SR0).

Also, PRIR0 to PRIR3 in the storage means 101 correspond to PU0 to PU3, respectively.

[Second LSI Configuration: Concentrated Management Type by Shared Hardware]

Figure 2:
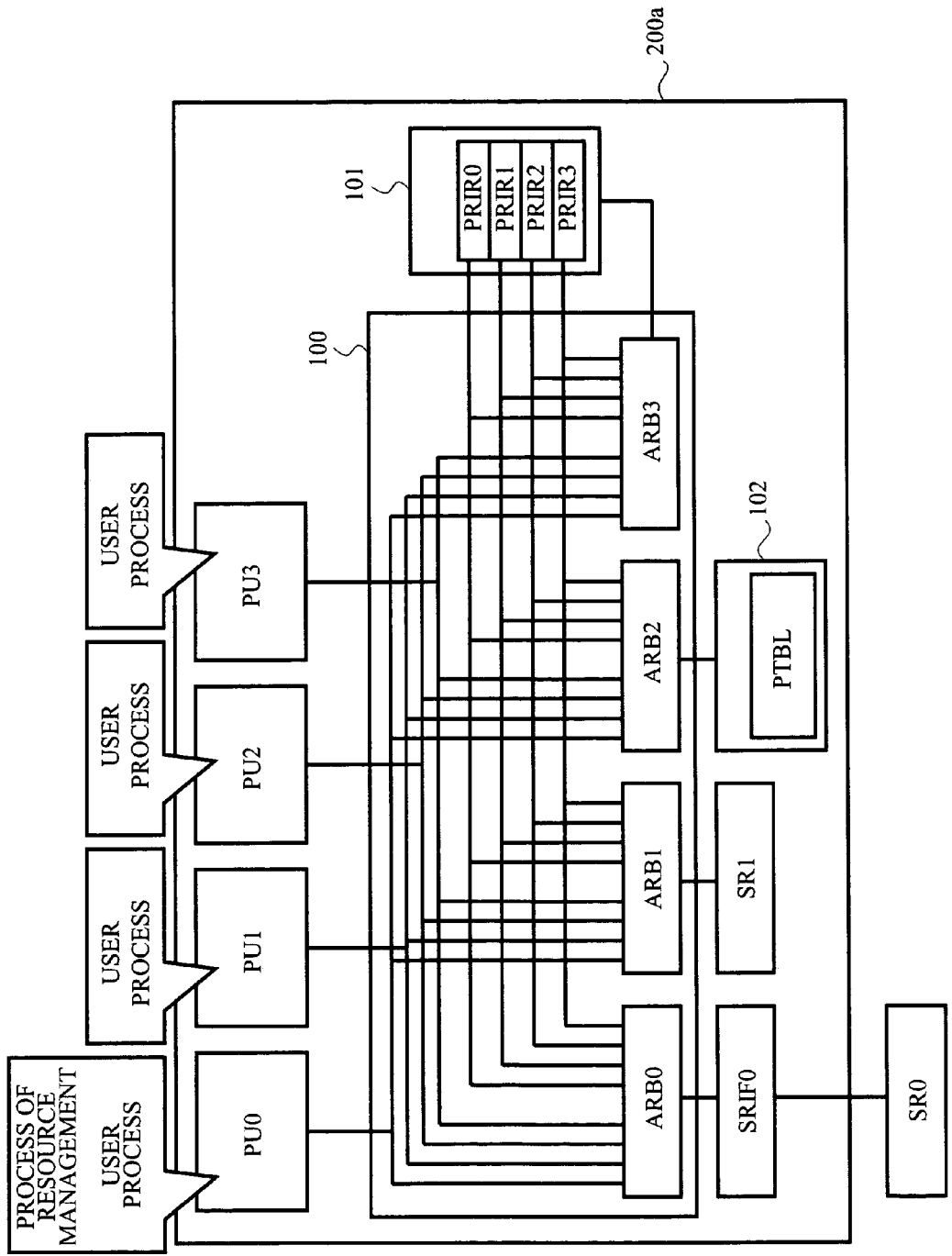
FIG. 2 is a block diagram showing a second configuration of the LSI according to one embodiment of the present invention.

FIG. 2 is a block diagram showing a second configuration of the LSI according to one embodiment of the present invention. FIG. 2 depicts a case where the IRM in FIG. 1 is not provided as an independent unit. In this case, a process corresponding to that performed in the IRM is executed as software by any one of the processing units PU0 to PU3 originally mounted for executing a user process.

An LSI 200a in FIG. 2 has an IRM mounted in the PU0. Since the PU0 also executes other user process, an IRM program implemented as software is executed with appropriately switching the user process and the IRM process. Switching to the IRM process from other process follows a scheduling policy in the PU0 such as a startup by a trigger from other unit (for example, an interrupt or a write to a predetermined flag area) or periodical startups. Since other configuration is identical to that of FIG. 1, the description thereof is omitted here.

A merit of taking this configuration is that the amount of hardware can be reduced, and a demerit thereof is that a period in which the user process is inhibited occurs.

[Third LSI Configuration: Distributed Management Type]

Figure 3:
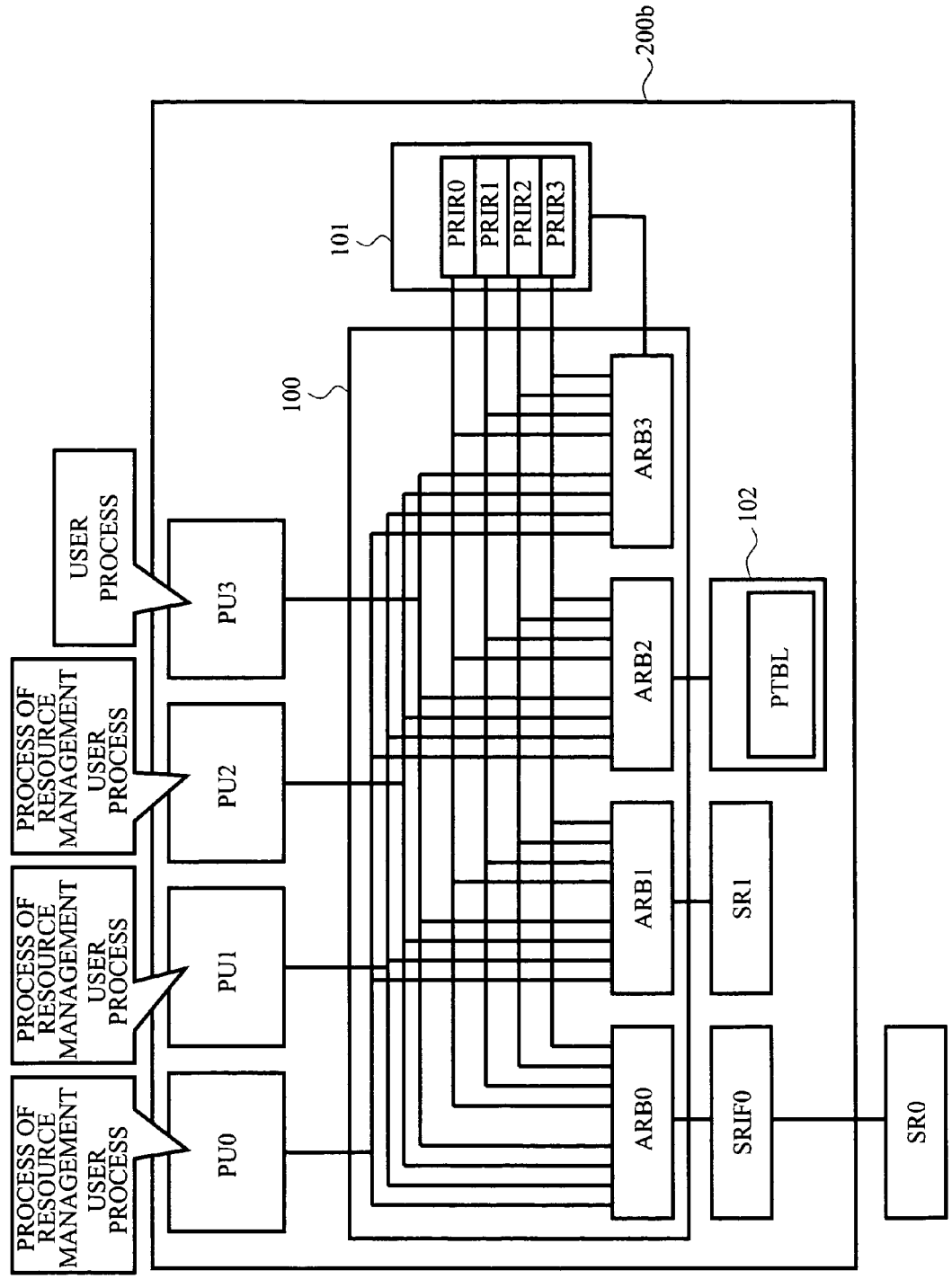
FIG. 3 is a block diagram showing a third configuration of the LSI according to one embodiment of the present invention.

FIG. 3 is a block diagram showing a third configuration of the LSI according to one embodiment of the present invention. Similar to the embodiment of the second LSI configuration shown in FIG. 2, an LSI 200b of FIG. 3 does not include an IRM as an independent unit. The LSI 200b is different from the LSI 200a according to the second LSI configuration in that an IRM function is incorporated in a plurality of processing units. In this manner, a load on one processing unit can be reduced.

In the LSI 200b of FIG. 3, each of the PU0 to PU2 has an IRM incorporated therein. Each IRM calculates a priority of a process in its own processing unit and then writes the priority in the storage means 101. A merit of taking this configuration is that the amount of hardware can be reduced and a load with an increase in the number of mounted units is small. A demerit thereof is that an IRM is incorporated in a plurality of processing units.

Note that, in any of the first to third LSI configurations, the processing units PU0 to PU3 are not necessarily processing units generally used. For example, they may be interface units for inputting information from outside or outputting information to the outside.

Also, the LSIs 200, 200a, and 200b according to these embodiments are each formed on one semiconductor chip through a known semiconductor manufacturing technology.

[Scheduling Block Configuration]

Figure 7:
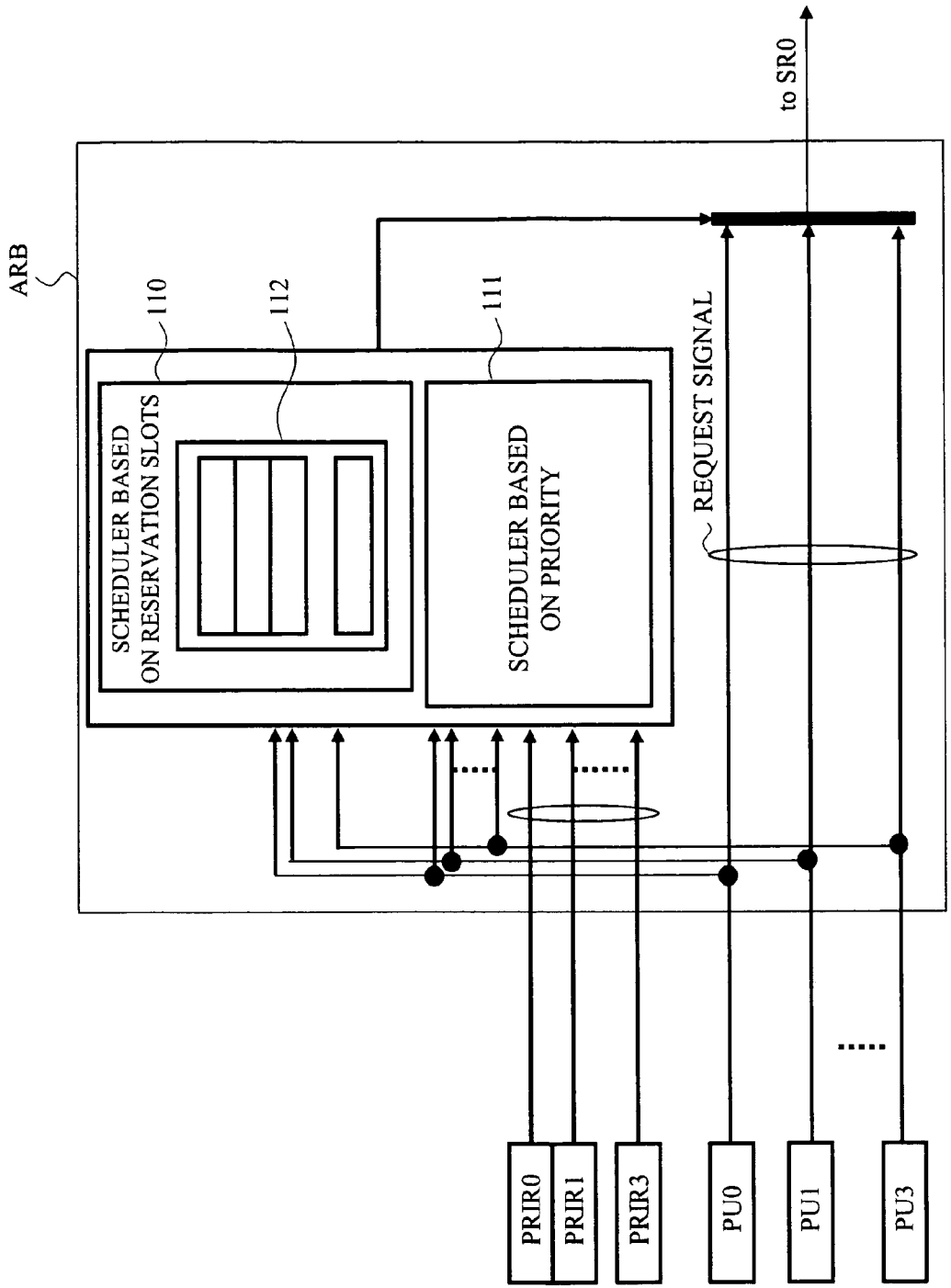
FIG. 7 is a block diagram showing the configuration of a scheduling block of the LSI according to one embodiment of the present invention.

FIG. 7 depicts one embodiment of any one of the scheduling blocks ARB0 to ARB3 in the interconnect unit 100 in the first to third LSI configurations. An ARB shown in FIG. 7 is any one of the scheduling blocks ARB0 to ARB3. The ARB includes, for example, a scheduler based on reservation slots 110 and a scheduler based on priority 111. The scheduler based on reservation slots 110 includes storage means 112, for example. The scheduler based on priority 111 is a mechanism that actively performs scheduling according to the priority inputted from the storage means 101 to the ARB. The scheduler based on reservation slots 110 is a mechanism that allocates a shared resource to a unit previously specified in the storage means 112 at a ratio previously specified in the storage means 112.

(Control Flow)

[First Scheme]

Figures 1, 4A:
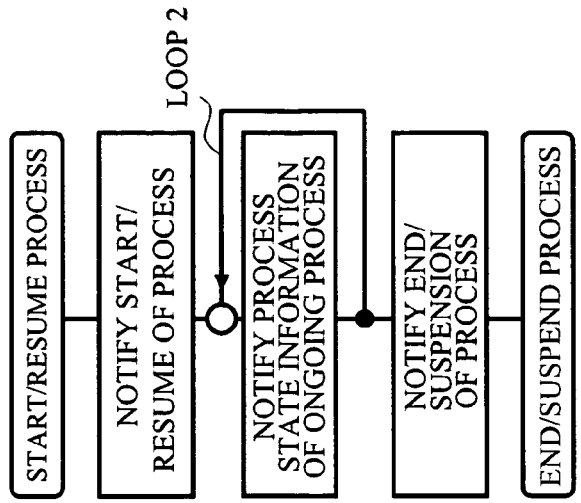
Figures 2, 4A:
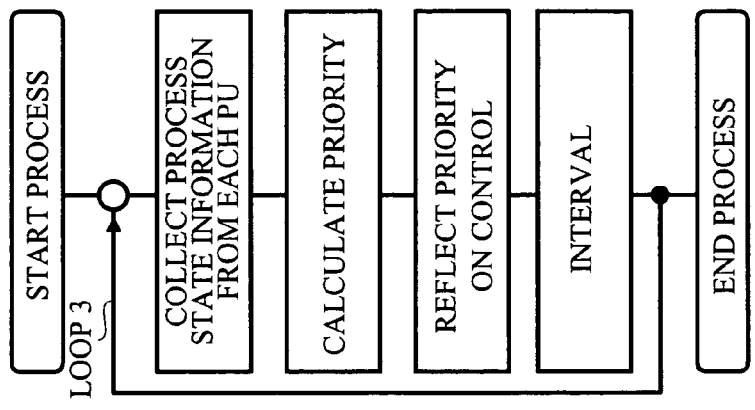
Figure 4B:
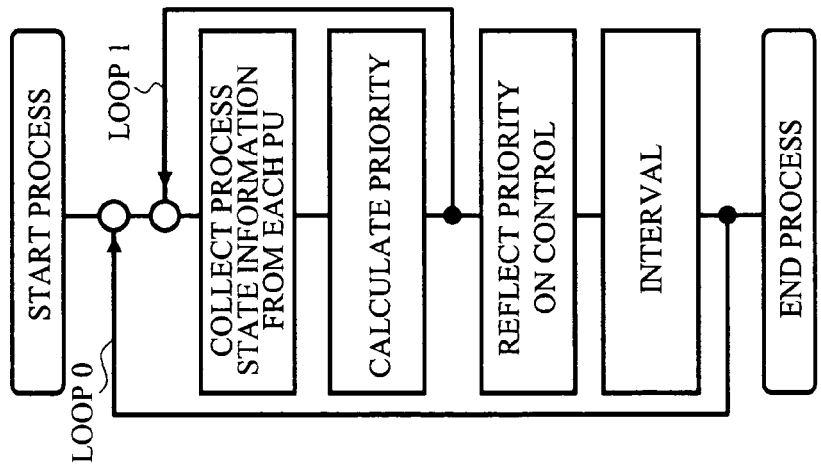
FIG. 4B is a diagram showing a first control flow of the LSI according to one embodiment of the present invention.

FIGS. 4A-1, 4A-2, and 4B depict a control flow of each of the LSIs 200, 200a, and 200b in the first to third LSI configurations. FIGS. 4A-1 and 4A-2 depict the operation of the resource management unit IRM, and FIG. 4B depicts the operation of each of the processing units PU0 to PU3.

In the flow of FIGS. 4A-1, the IRM collects the processing state of a task being executed by all of the processing units to be controlled and then calculates a priority based on the collected information (loop 1). Collection of the information about the processing state of the task is performed by reading the process state information of each processing unit written in storage means such as the storage means 102 accessible by the IRM. The loop 1 is repeated as many times as the number of the processing units.

Next, a control is performed based on the calculated priorities. When scheduling the use of a shared resource, the priorities calculated in advance are written in the storage means 101 (loop 0). In response to this, the scheduling blocks ARB0 to ARB3 provide a resource use right to a processing unit in consideration of the priority specified by the storage means 101. The loop 0 is continuously repeated until the system stops.

FIGS. 4A-2 is another embodiment of the flow of FIGS. 4A-1. The IRM collectively performs the collection of a processing state of a task being executed by the processing units to be controlled, the calculation of a priority, and the control based on the priority for each processing unit to be controlled. Such a series of IRM processes may be performed at periodical intervals or at the timing of a trigger such as an interrupt from the processing unit to be controlled (loop 3).

In the flow of FIG. 4B, after the processing units PU0 to PU3 notify the start/resume of the process to the IRM, they notify the process state information of the ongoing process (loop 2). The notification of the process state information is performed at an appropriate timing by writing state information of the process being executed by the processing unit itself in the storage means accessible by the IRM.

The process state information is written in such a location as any one of an area of an on-chip memory, the processing unit or its attached storage means, the storage means 102 dedicated for controlling the information, and the storage means 101. Also, the process state information may be written in a plurality of locations in one LSI. For example, one processing unit writes its own process state information in one area of the on-chip memory and another processing unit writes its own process state information in the storage means attached to that processing unit.

[Second Scheme]

Figures 1, 5A:
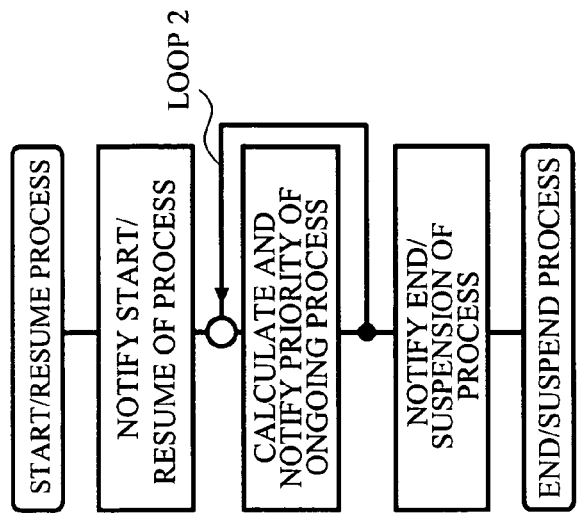
Figures 2, 5A:
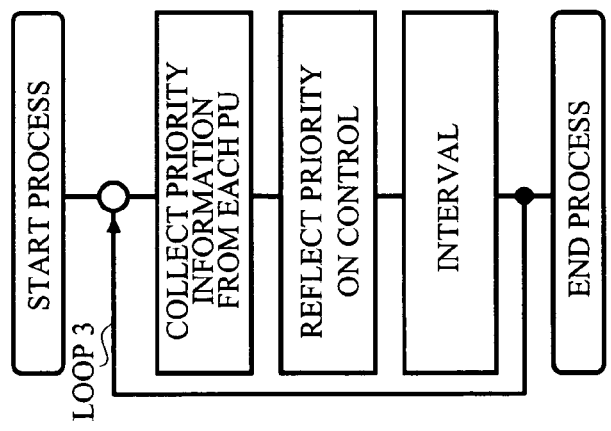
Figure 5B:
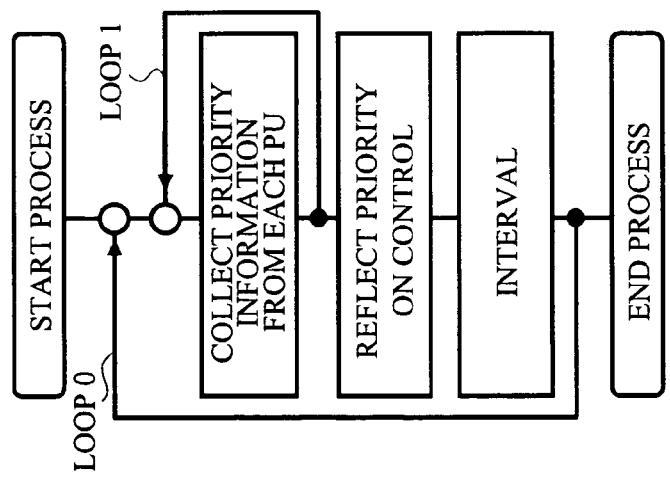
FIG. 5B is a diagram showing a second control flow of the LSI according to one embodiment of the present invention.

FIGS. 5A-1, 5A-2, and 5B depict another control flow of each of the LSIs 200, 200a, and 200b in the first to third LSI configurations. FIGS. 5A-1 and 5A-2 depict the operation of the resource management unit IRM, and FIG. 5B depicts the operation of each of the processing units PU0 to PU3. In the first scheme, priority calculation is performed by the IRM, but may be performed by each of the processing units.

At this time, from all of the processing units to be controlled, the IRM collects the priorities of the tasks being executed by these processing units and performs the controls based on the priorities. When scheduling the use of a shared resource, the priorities are written in the storage means 101. In response to this, the scheduling blocks ARB0 to ARB3 provide a resource use right according to the priority specified by the storage means 101.

The processing units PU0 to PU3 write the priority of the process being executed by itself in storage means accessible by the IRM.

Also, in the second scheme, the processing unit may directly write the priority in the storage means 101.

[Third Scheme]

Furthermore, the first scheme and the second scheme may be used in combination. For one unit, the unit itself writes the priority in storage means accessible by the resource management unit IRM. For another unit, the unit writes the process state information in storage means accessible by the IRM, and the IRM then calculates a priority based on the written information.

The IRM uses these priorities for control.

(Priority Generation)

Next, a scheme of generating process state information and a priority is described. In accordance with features of the processing unit and a task to be executed, a plurality of schemes can be used in combination.

[First Scheme for Priority Generation]

A priority is calculated with using a target processing rate PR and an actual processing rate PA as process state information. A higher priority is set to a process where the actual processing rate is small with respect to the target process rate. In one embodiment, a priority PRI can be calculated as follows.

$PRI = C \cdot (PR - PA)$, where C is a constant.

For example, a number of execution instructions per unit time can be used as the target processing rate PR and the actual processing rate PA. The target processing rate PR is set in advance, and a value in storage means retaining the result of counting the number of execution instructions in the processing unit is used as the actual processing rate PA. The processing unit notifies the information including the actual processing rate PA and the target processing rate PR to the IRM, and the IRM then calculates a priority from these rates.

Also, the target processing rate PR and the actual processing rate PA can be calculated from a waiting time of the processing unit. The processing unit notifies a waiting time for instruction or data or a waiting time occurring due to a handshake of a control signal to the IRM, and the IRM calculates a priority from the waiting time.

[Second Scheme for Priority Generation]

A second scheme is similar to the first scheme in that the target processing rate PR and the actual processing rate PA are used. As the target processing rate PR, a value calculated by using a time limit and a consumed time (cycle) is used, and as the actual processing rate PA, the degree of progress of an application is used.

The notification of the degree of progress of the application can be achieved by calling a small program for notifying the degree of progress from a user processing program. Also, similar notification of the degree of progress may be implemented as hardware. By way of example, the former is suitable for general-purpose processing units, and the latter is suitable for hardware accelerators.

Since the application itself is monitored in the second scheme, a more accurate control can be performed than the control in the first scheme. However, there are some applications to which this scheme is difficult to be applied. Therefore, in many cases, a combined use of these schemes is required.

A control including both of the first and second schemes is also possible.

ONE SPECIFIC EXAMPLE

Figure 6:
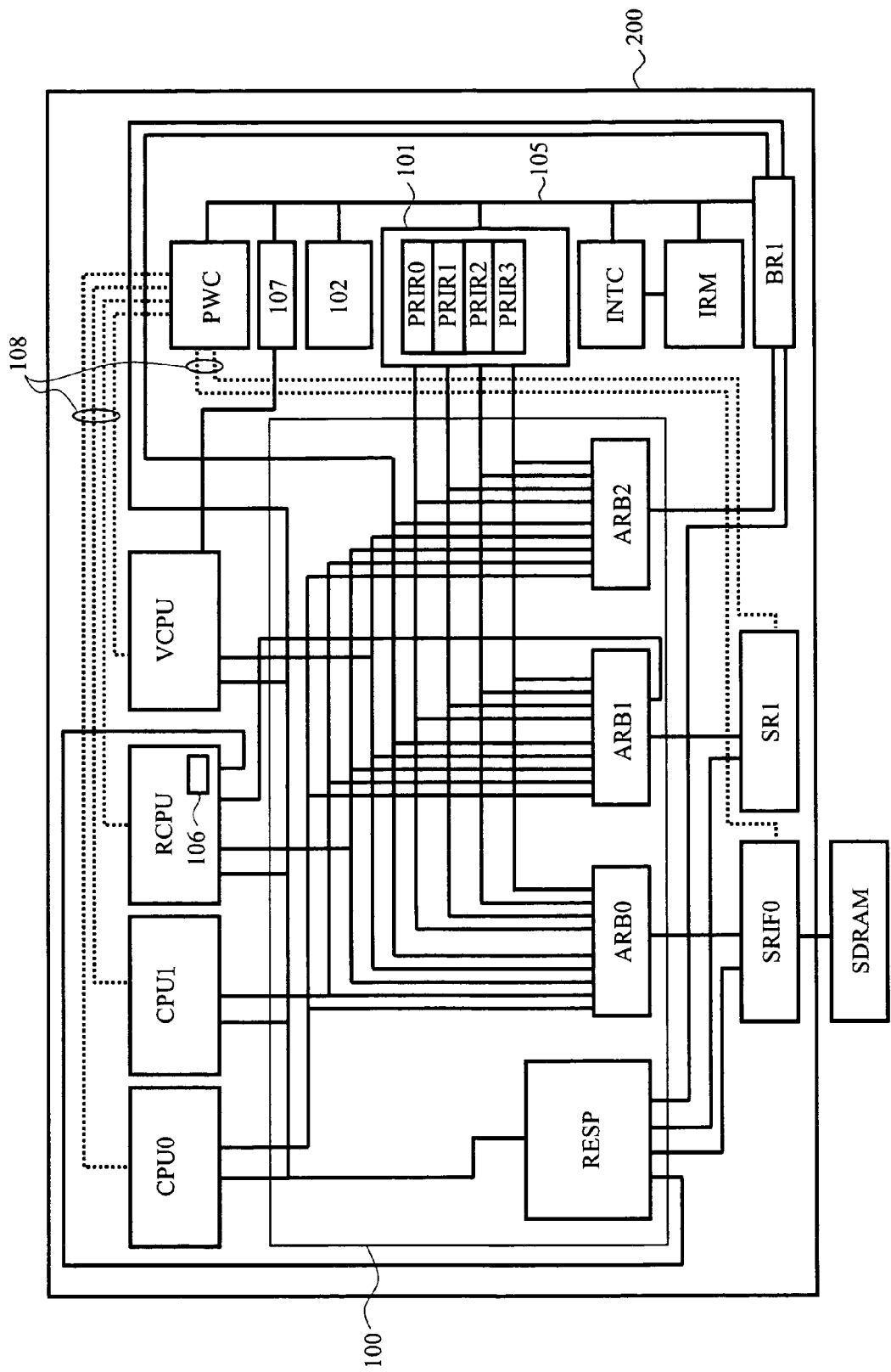
FIG. 6 is a block diagram showing a specific configuration of the LSI shown in FIG. 1.

FIG. 6 depicts a specific example of configuration of the LSI of FIG. 1.

As the processing units PU0 to PU3, the LSI 200 shown in FIG. 6 includes: general-purpose processors CPU0 and CPU1; a reconfigurable processing unit RCPU, which is a reconfigurable computing unit; and a video coding/decoding unit VCPU. These processing units share an SDRAM. A response block RESP in the interconnect unit 100 is a block that transmits a response to an initiator (processing unit, bridge unit BR1), and the ARB0 to ARB2 are the scheduling blocks described above. In this configuration, blocks associated with resource management are connected via the bridge unit BR1. An interrupt controller INTC is a unit that controls an interrupt to the IRM. 101 and 102 denote storage means for the control associated with resource management. A power control unit PWC is a unit for controlling power for each component, and 105 denotes an interface connecting these units. PRIR0, PRIR1, PRIR2, and PRIR3 in the storage means 101 are storage means which transmit the priorities of the CPU0, CPU1, RCPU, and VCPU to ARB0 to ARB2 to reflect them on scheduling, and values thereof can be updated through the interface 105.

Next, the operation associated with resource management is described.

In order to calculate a priority based on the first scheme for priority generation, the CPU0 writes the target processing rate PR necessary for calculation and information including an ID for identifying the task in an area readable by the IRM (in this example, the storage means 102) in synchronization with task switching, and then notifies them to the IRM via the interrupt controller INTC. Also, the CPU0 appropriately writes information indicative of the actual processing rate PA in an area readable by the IRM (in this example, the storage means 102). In response to the interrupt, the IRM recognizes that the CPU0 is a control target, and periodically reads the process state information from the storage means 102 to calculate a priority.

The CPU1 has, in a user program to be executed on the CPU1, the program for writing the process state information based on the second scheme for priority generation and information containing an execution task ID in an areas readable by the IRM (in this example, the storage means 102).

The RCPU is an accelerator and its operation is controlled by the CPU0 in this example. The RCPU has a function to write the process state information based on the first scheme for priority generation in the storage means 106 accessible by the IRM. The CPU0 notifies operation information such as a startup of the RCPU to the IRM via the interrupt controller INTC. In response to this, the IRM recognizes that the RCPU is a control target, and periodically reads the process state information from the storage means 106 to calculate a priority.

The VCPU is a hardware accelerator and its operation is controlled by the CPU0 in this example. The VCPU has a function to write the process state information based on the second scheme for priority generation in storage means 107 accessible by the IRM. The CPU0 notifies operation information such as a startup of the VCPU to the IRM via the interrupt controller INTC. In response to this, the IRM recognizes that the VCPU is a control target and periodically reads the process state information from the storage means 107 to calculate a priority.

Also, the IRM writes the priority calculated by the above-mentioned mechanism in the storage means 101 in order to reflect the calculated priority on the SDRAM use sequence.

Furthermore, the mechanism for LSI management according to this embodiment is effective for the purposes other than a purpose of optimizing the sharing of a functional block/device. One of the application examples is power control. In this example, the IRM also controls power of the LSI 200. A PWC is a unit for controlling the power of each unit on the chip. Also, a power control interface 108 for each unit and an interface 105 for performing the control from the IRM are provided. The IRM performs power control for each unit via the PWC based on the priority calculated by the above-described mechanism and the power required for each process. Control targets include, for example, a clock frequency, supply voltage (VDD) (increase/decrease), and threshold voltage. Also, a control may be performed not only for each unit, but also for each area including a plurality of units.

The LSI configuration of FIG. 6 can be similarly applied to the second and third LSI configurations described above.

In the manner described above, in the LSI where a plurality of real-time applications are parallelly processed, their processes are efficiently executed by using limited resources. By using the priority calculated from the execution state of each process, unified management throughout the LSI is performed. By doing so, the efficiency in use of the limited resources is globally optimized, which improves a total performance. Consequently, an improvement in performance by several tens of percents can be expected.

Figure 8A:
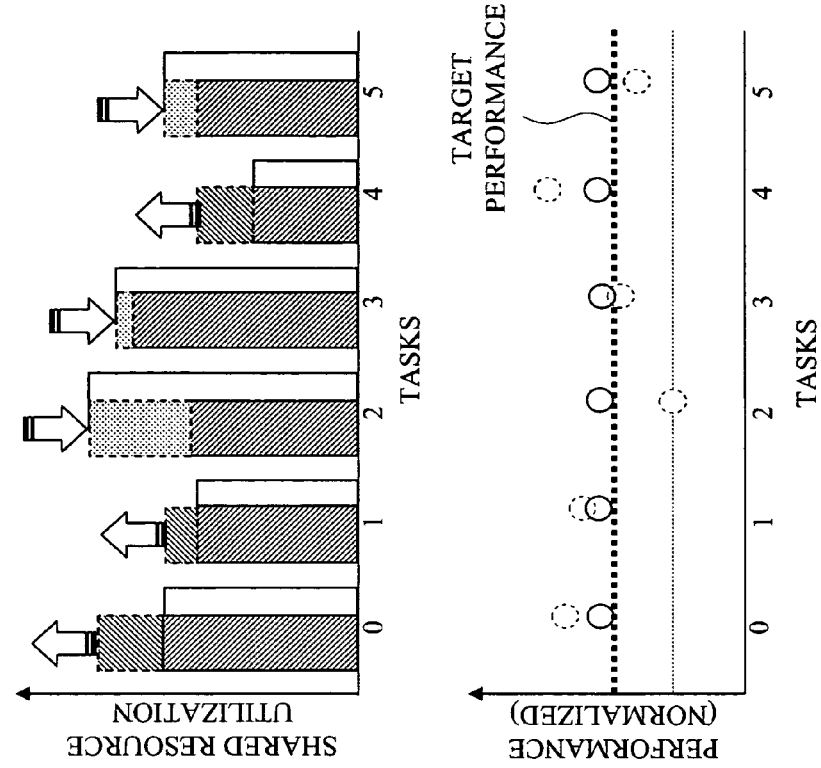
FIG. 8A is a diagram showing the performance of a conventional LSI.
Figure 8B:
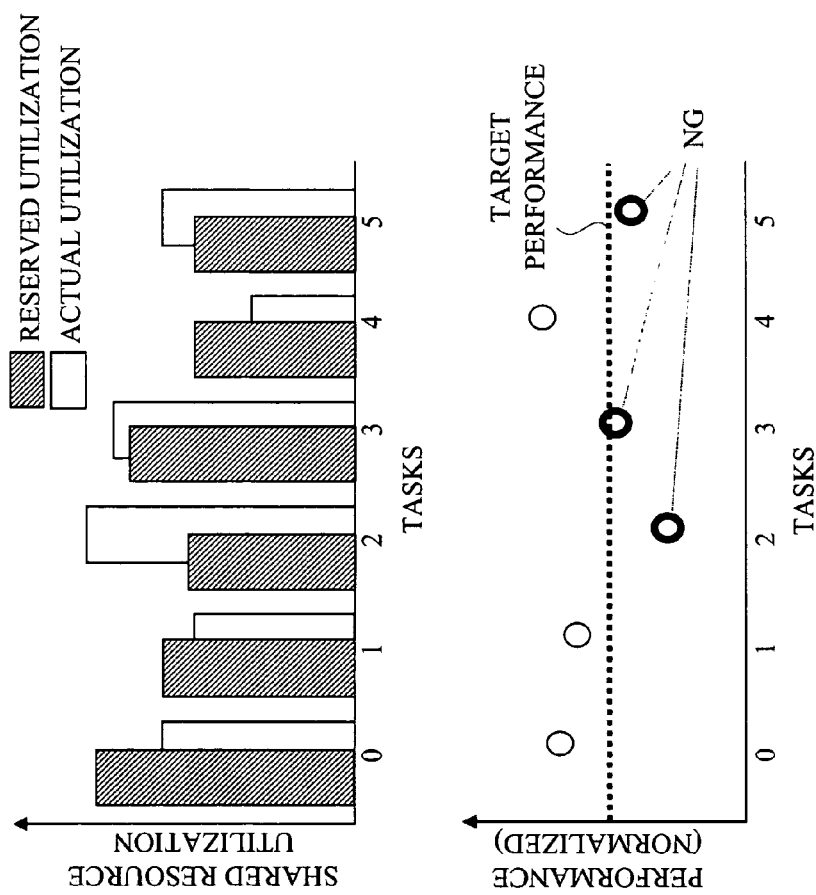
FIG. 8B is a diagram showing the performance of an LSI according to the present invention.

FIG. 8 shows the effects obtained from the LSI according to this embodiment, where FIG. 8A depicts the performance of a conventional LSI, and FIG. 8B depicts the performance of an LSI according to this embodiment.

In the conventional scheme, as shown in FIG. 8A, even when the total amount of resource is sufficient, the resources cannot be appropriately distributed among a plurality of tasks. As a result, there are tasks that cannot achieve a target performance (tasks 2, 3, and 5), and therefore, a total performance does not reach the target.

According to the present invention, as shown in FIG. 8B, variations among the tasks are decreased, and it is possible to achieve the target performance.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be used in industries of manufacturing semiconductor devices, electronic devices, and others.

What is claimed is:

1. A semiconductor integrated circuit device including a plurality of processing units, comprising:

a control unit which calculates a priority of a process to be executed on said semiconductor integrated circuit device;

a scheduler which provides a right to use a shared resource to one of said plurality of said processing units based on said priority;

first storage means for storing information notifying the priority calculated by said control unit to said scheduler;

second storage means for retaining information for said control unit to calculate said priority;

wherein said control unit has a function to collect a state of a process being executed by each of said plurality of processing units from said second storage means, calculate a priority of the process based on said state of the process, and write priority information in said first storage means based on said priority, and each of said plurality of processing units has a function to write a state of a process being executed by each of said plurality of processing units itself in said second storage means.

2. The semiconductor integrated circuit device according to claim 1, wherein said control unit is incorporated as software in at least one or more of said plurality of processing units.

3. The semiconductor integrated circuit device according to claim 1, wherein said function of said control unit calculates priority based on a target processing rate and an actual processing rate of a process being executed on said semiconductor integrated circuit device.

4. The semiconductor integrated circuit device according to claim 1, wherein said priority is calculated based on a time limit.

5. A semiconductor integrated circuit device including a plurality of processing units, comprising:

a control unit which calculates a priority of a process to be executed on said semiconductor integrated circuit device;

a scheduler which provides a right to use a shared resource to one of said plurality of processing units based on said priority;

first storage means for storing information notifying the priority calculated by said control unit to said scheduler; and second storage means for retaining information for said control unit to calculate said priority;

wherein said control unit has a function to collect, from another one of said plurality of processing units to be controlled by said control unit, a priority of a process being executed by said another one of said plurality of processing units and write priority information in said first storage means, and said another one of said plurality of processing units has a function to write the priority of the process being executed by said another one of said plurality of processing units itself in said second storage means.

6. The semiconductor integrated circuit device according to claim 5, wherein said control unit is incorporated as software in at least one or more of said plurality of processing units.

7. The semiconductor integrated circuit device according to claim 5, wherein said priority is calculated based on a target processing rate and an actual processing rate of a process being executed on said semiconductor integrated circuit device.

8. The semiconductor integrated circuit device according to claim 5, wherein said priority is calculated based on a time limit.

9. A semiconductor integrated circuit device including a plurality of processing units, comprising:

a control unit which calculates a priority of a process to be executed on said semiconductor integrated circuit device;

a scheduler which provides a right to use a shared resource to one of said plurality of processing units based on said priority; and first storage means for storing information notifying the priority calculated by said control unit to said scheduler, wherein each of said plurality of processing units calculates a priority of a process being executed by itself based on a state of the process, and writes priority information in said first storage means based on said priority.

10. The semiconductor integrated circuit device according to claim 9, wherein said control unit is incorporated as software in at least one or more of said plurality of processing units.

11. The semiconductor integrated circuit device according to claim 9, wherein each of said plurality of processing units calculates said priority based on a target processing rate and an actual processing rate of a process being executed on said semiconductor integrated circuit device.

12. The semiconductor integrated circuit device according to claim 9, wherein said priority is calculated based on a time limit.

* * * * *